United States Patent Office 3,362,315
Patented Jan. 9, 1968

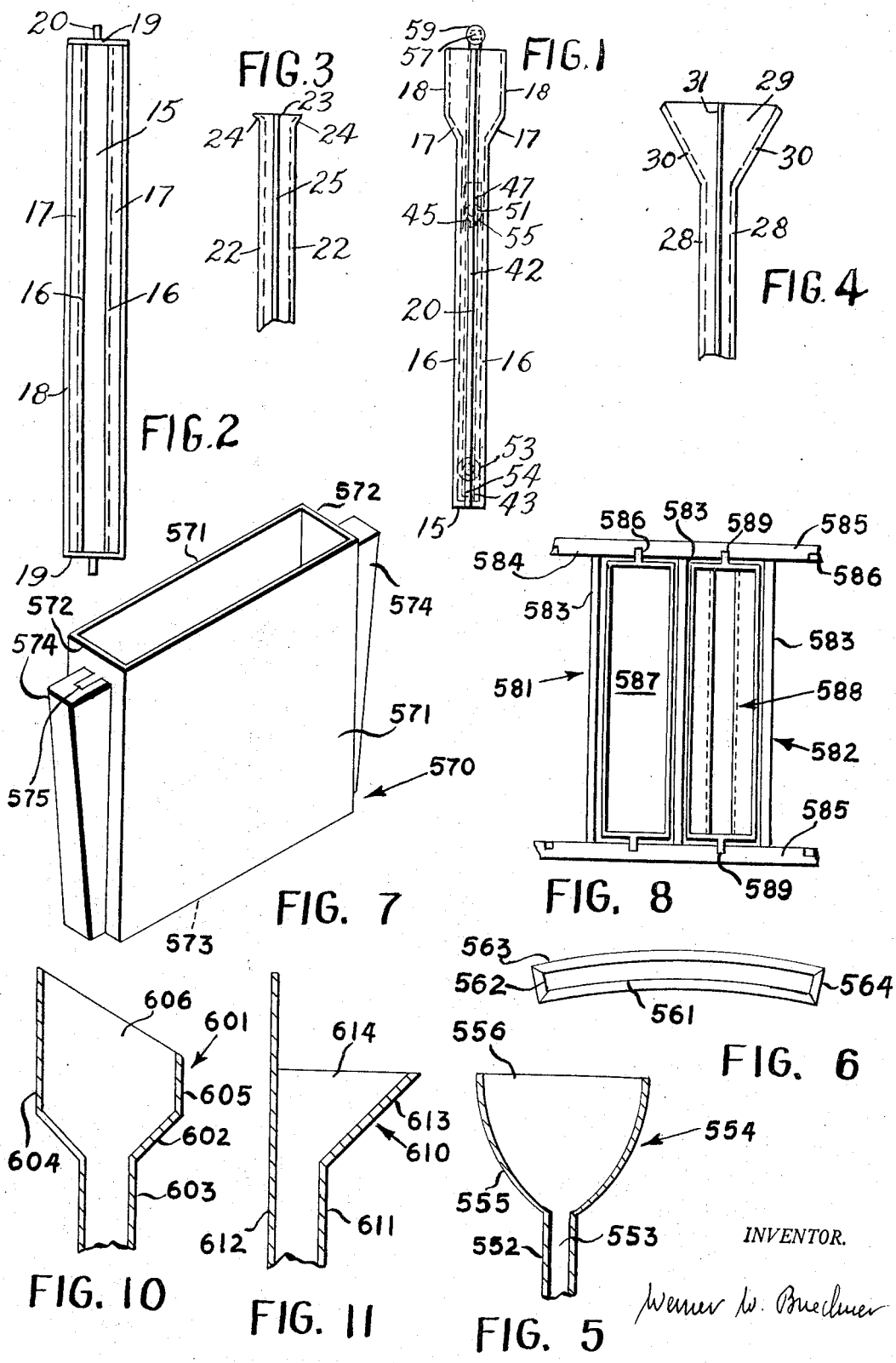

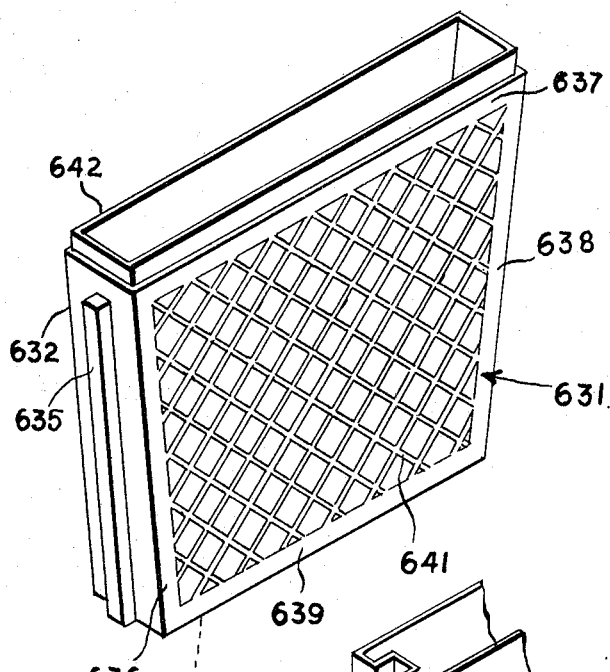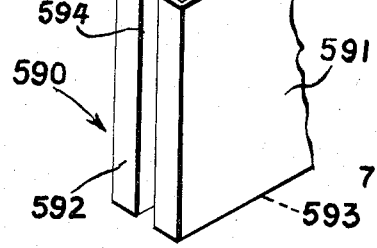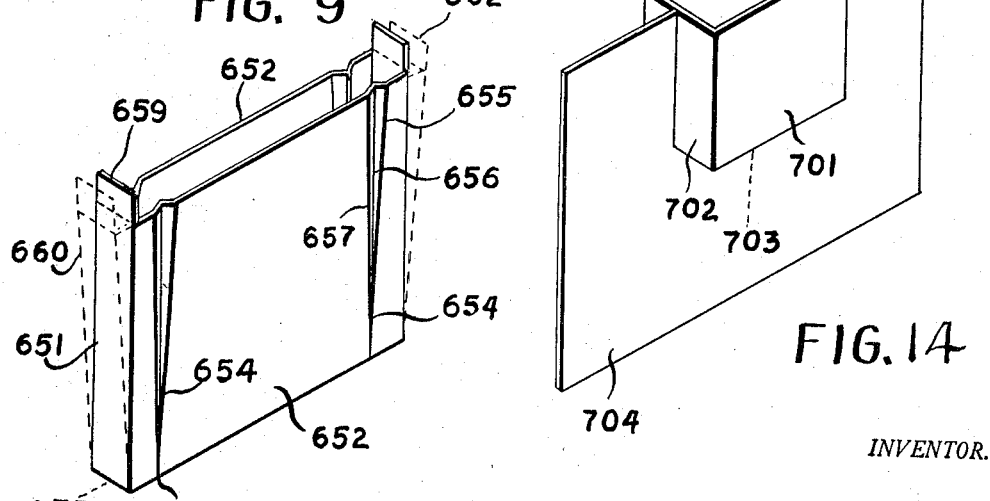

3,362,315
PHOTOGRAPHIC TREATING VESSEL
Werner W. Buechner, 4407 Gladding Court,
Midland, Mich., 48640
Filed Feb. 3, 1964, Ser. No. 342,198
8 Claims. (Cl. 95—96)

The present invention relates to a novel vessel for photographic treating solutions and more specifically to a novel upright vessel for the treatment of generally plane photographic materials.

This application is a continuation-in-part of my co-pending application Ser. No. 52,524, filed Aug. 29, 1960, now Patent No. 3,236,649.

It is an object of the present invention to provide an upright vessel which is adapted to be used in the treatment of photographic sheet materials. It is another object of the present invention to provide an upright vessel which is adapted to be used in the treatment of a standard sheet or of a small multiplicity of standard sheets of photographic material, yet requiring a minimum quantity of treating solution.

Another object of the invention is the provision of a vessel which is adapted for the treatment of photographic films in strip form or in form of continuous bands of film contained on a carrier such that the film is located in at least one plane. It is another object of the invention to provide an upright vessel which is adapted to be inserted in a water bath, in general sealing relationship with the side walls of the water bath, such that an underflow for a stream of water is provided between the bottom of the water bath and the bottom of the vessel.

It is a further object of the invention to provide an upright vessel which lends itself to the use in a compartmented water bath, such that a predominantly vertical flow pattern of a flowing stream of water is established when the vessel is inserted in a compartment of the water bath.

It is still another object of the invention to provide an upright vessel which is disposable.

Another object of the invention is the provision of an upright vessel which is adjustable in its thickness so as to permit variation of the liquid capacity of the upright vessel while maintaining a desired liquid level in the vessel.

Still another object of the invention is the provision of an upright vessel which is adapted to be used with particular advantage for the treatment of photographic color materials by multistep developing and/or aftertreating processes by professional or amateur photographers.

Another object is the provision of an upright vessel which is particularly adapted for use in photographic developing apparatus having means for automatic mechanical agitation and/or automatic forwarding means.

Other objects will become apparent as the description of the invention proceeds.

The invention comprises an upright vessel formed by a bottom, two major side walls, two end walls and an opening at the top, the vessel is provided with generally vertical sealing means along the vertical end walls. Said end wall mounted sealing means are advantageously adapted to fit removably into cooperating sealing means provided in the side walls of a water bath or of a compartment in which the vessels are to be inserted for their use. The cooperating sealing means in the water bath and on the said end walls of the vessel are preferably adapted such that they provide a substantially liquid tight seal between at least a major portion of each of the end walls of the vessel and the vicinal portion of the side walls of the water bath. In this embodiment of the vessel, the said cooperating sealing means are advantageously adapted to support the vessel in the water bath in a position such that the bottom of the vessel is at least slightly raised from the bottom of the water bath so as to leave a passageway, permitting free flow of a stream of water between the bottom of the vessel and the bottom of the water bath.

This embodiment of the upright vessel is used with great benefit in a compartmented water bath of a kind, as is described in more detail and claimed in my copending application Ser. No. 342,029 filed Feb. 3, 1964. In the device of this application the cooperating sealing means are provided in the vertical end walls of the compartment so as to receive and hold the upright vessel of the present invention by its own sealing means, when it is inserted in said compartment.

As will be apparent from the following description, the embodiment of the upright vessel containing the sealing means may be constructed with or without a superimposed trough-like reservoir. Generally, the superimposed trough-like reservoir is employed with greatest benefit in the very narrow upright vessels of the invention and with vessels which are designed to be used with such carrier means for the photographic sheet materials which have a horizontal cross section not much smaller than the horizontal top opening of the vessel.

The invention comprises furthermore a disposable upright vessel which is characterized by the design and functional features of either of the just mentioned embodiments of the upright vessel. The disposable vessel may be designed to be rigid enough to be self-supporting, and adapted to be used in the water bath or in the compartmented water bath in lieu of the just described upright vessels, or more advantageously, the disposable vessel is used in combination with a supporting vessel which is adapted to removably receive the disposable vessel, and which supporting vessel may advantageously incorporate any one or more of the features of the hereinbefore described embodiments of the upright vessel of the invention. The major side walls of the said supporting vessel are advantageously perforated so as to expose to the surrounding water a maximum of heat exchange surface of the thin-walled disposable vessel. The invention comprehends also disposable vessels of a shape and design differing from those described and particularly the use of disposable vessels of any desired shape and design in combination with a supporting vessel of suitably adapted design and size. The disposable vessel and the supporting vessel of this embodiment may have the shape of the usual flat developing tray or of the standard developing vessels. However, as will become apparent from the following description, the disposable upright vessel and supporting vessel offer the greatest advantage and benefits.

Further embodiments and modifications of the upright vessel will be described in the following detailed description of the invention and in the accompanying drawings, wherein:

FIG. 1 represents a vertical elevational view of the narrow side of an upright treatment vessel of the invention and FIG. 2 a top plan view of the vessel depicted in FIG. 1. FIG. 1 also shows a side elevational view of a rectangular support inserted into the treating vessel in operating position (low position).

FIG. 3 is a vertical elevational view of the upper portion of a modified upright vessel.

FIG. 4 depicts a vertical elevation of still another modification of the upright vessel of the present invention.

FIG. 5 illustrates a fragmentary vertical cross section of the upper portion of still another embodiment of the upright vessel of the invention.

FIG. 6 represents a top plan view of a curved embodiment of the upright treating vessel of the invention.

FIG. 7 is an isometric view of the upright vessel of the present invention provided with generally vertical sealing means.

FIG. 8 depicts a top plan view of a fragment of a compartmented water bath containing two treating vessels of greatly varying capacity and different basic design inserted in neighboring compartments.

FIG. 9 depicts a fragmentary isometric view of an upright vessel comprising female sealing means.

FIG. 10 and FIG. 11 illustrate fragmentary cross sectional views of the upper portions of two other embodiments of the upright vessel of the invention which are particularly adapted to be used in composite apparatus comprising automatic forwarding means.

FIG. 12 is an isometric view of an embodiment of the supporting vessel with the disposable vessel inserted therein.

FIG. 13 is an isometric view of another embodiment of the disposable vessel of the present invention.

FIG. 14 depicts an isometric view of an upright vessel of smaller than standard size which, by the use of oversized sealing means is adapted to be used in a standard size bath or compartmented bath.

Prefatory to a detailed description of the device of the invention and of its utility, some of the more important terms used herein will be explained in order to provide a better understanding of the nature of the invention and of its scope.

The term "upright vessel" as used herein is intended to refer to a generally vertical vessel having a height and length substantially greater than the width of the vessel. The vessel is formed by two major side walls, two vertical end walls and a bottom, forming a closed container with a single opening at the top of a shape and size, so as to permit readily the insertion and removal of the standard photographic sheet material of the maximum size for the treatment of which the vessel is designed. The open top of the upright vessel is conveniently in a horizontal position and may be provided with a removable or pivotable lid. The treating media and especially the treating solutions to be used in the vessel are usually filled in and poured out through said top opening.

The vessel is advantageously used with its side and end walls in a generally vertical orientation and with its bottom in a generally horizontal orientation. The term "generally vertical" is intended to encompass positions of the side and/or end walls which vary substantially from the vertical positions to a maximum of about 30° and sometimes up to 45°. The slanting orientation of the walls is encountered particularly in the case where the side and/or end walls of the vertical vessel are slanted or sloped in relation to the central vertical axis or plane of the upright vessel. Independently thereof, the vessel itself may be used in a slanted orientation, particularly with its major side walls deviating substantially from the vertical position. This is independent of the relative position of the major side walls to each other, i.e. whether the major side walls are parallel to each other or sloping toward each other at the top or bottom portion, respectively, as the case may be.

The term "major side walls" as used herein, is intended to refer to the pair of opposite walls, which are the largest generally vertical walls comprised in the vessel. Usually the major side walls are considerably longer than the vertical end walls adjoining them, though both the side walls and the end walls are usually of the same or similar height. The bottom is usually considerably smaller in surface area than the adjoining major side walls, the bottom may however be larger in some exceptional circumstances and in some of the specific embodiments of the upright vessel, as will be explained hereinafter in more detail.

The terminology "generally parallelepipedal" is intended to refer to a shape which represents, in the ideal situation, a parallelepiped. The term includes, however, also shapes which deviate considerably from this basic configuration by the fact that one or more of the sides of the parallelepiped are slanted or sloped in relation to the axis of the parallelepiped. Thus, truncated prisms are included in the term the same as configurations in which the bottom and/or the top of the parallelepiped are slanted, non-horizontal or curved, so as to be joined to the side walls at angles other than 90°. Deviations of up to 45° or even more, from the horizontal plane of the top and/or bottom sides of the parallelepiped are included in the scope of the invention as will be explained hereinafter.

The term "vertical sealing means" is intended to encompass means joined or attached to the vertical end walls or to the edges of the major vertical side walls. The sealing means provided on the vessels of the invention are intended to cooperate with coacting sealing means provided in the water bath or in the compartments of the compartmented water bath in which the vessel is to be used. The term "vertical sealing means" comprises sealing means which are, with the upright vessel in operating position, truly vertical. It is, however, intended to encompass also any generally vertical orientation of the sealing means for example, where the sealing means are wedge-shaped or slanted so that their outermost free edges form an angle with the vertical plane of up to 30° or more but less than 45°.

The expression "disposable vessel" as used herein is meant to indicate that the vessel is made of a material and by methods inexpensive enough to permit disposal or discarding of the vessel after only one or after a few uses. The measure of disposability is usually determined by setting the convenience of using a new clean vessel in relation to the need of storing and cleaning a permanent, reusable vessel after every use. The use of a disposable vessel in some of the more complex photographic processes such as in multistep color developing processes provides not only the convenience of saving the trouble and time of thoroughly cleaning the vessel after each use but eliminates also completely any risk of failure in the production of the final product due to unintentional incomplete cleaning and use of the contaminated vessel in a different step of the process where the contaminant could easily result in spoilage or adverse effect on the effectiveness or performance of the treating solution.

The term "trough-like reservoir" as used herein is intended to define a section of the vessel having a length similar to that of the vertical vessel, of a width substantially greater than that of the vessel and of a height which is less than that of the lower section of the upright vessel. The trough-like reservoir may have any desired vertical cross sectional configuration. Its lower horizontal edge must however conform to the upper edge of the lower section of the vessel, so as to permit liquid tight superimposition of the trough-like reservoir onto the lower section of the upright vessel in sealing relationship either removably or as an integral part of the vessel. The lower and upper end of the trough-like reservoir are both provided with an opening so as to permit insertion of the plane photographic material into the vessel.

The upright treating vessels of the present invention may be widely used in photographic liquid treatments and especially in the development, fixing and aftertreatment of flexible or rigid photographic positive and negative sheet materials such as films, reversal films, plates and paper base materials. The treating vessels of the present invention are especially useful and beneficial in their application to the more recently introduced photographic color processes and they are particularly adapted to the processing of color positive and negative multilayer color sheet and cut films as well as to the processing of multilayer positive color printing materials in sheet or cut form, particularly those on a paper base such as Kodak Ektacolor Paper.

The present invention includes many modifications of the device which make it particularly suited for application in the said multistep color developing processes, and particularly also in the photographic treating processes described and claimed in my copending application Ser. No. 52,524, filed Aug. 29, 1960, now Patent 3,236,649.

As is apparent, the plane photographic sheet which will be called hereinafter "photographic sheet" or "sheet" is usually inserted into the treating vessel in vertical or in generally vertical orientation.

Referring to FIGS. 1 and 2 of the accompanying drawings the upright vessel is defined by narrow bottom 15, wide vertical side walls 16, adjoining thereto slanted wall sections 17 and joined thereto vertical wall sections 18 and vertical end walls 19. Side walls 16 and the lower portion of vertical end walls 19 form the narrow vertical parallelepipedal portion of the vessel, and wall sections 17 and 18 together with the upper wide portion of vertical walls 19 form the extended upper portion or the superimposed trough-like reservoir of the vessel, respectively. To end walls 19 are joined rib-like sealing means 20.

Another modification of the vertical vessel is illustrated in FIG. 3 of the drawings, which is a vertical elevational view of the upper portion of the vessel. The lower portion of the vessel is defined like that shown in FIG. 1 by wide vertical side walls 22, narrow vertical end walls 23 and a narrow rectangular bottom (not shown). The upper portion of side walls 22 is flared outwardly continuing as short flanges 24 to form a rudimentary trough or reservoir having a substantially triangular cross section. To the end walls 23 are joined seal strips 25.

Still another modification of the upright vessel is shown in FIG. 4 which represents a vertical elevational view of the upper portion of the vessel. The lower portion of the vessel is defined by wide vertical side walls 28 narrow vertical end walls 29 and a rectangular bottom (not shown). The upper portion of side walls 28 is angled outward to continue as slanting wall sections 30 which together with the upper widened portion of the vertical walls 29 form a trough-like widened upper reservoir superimposed on the lower narrow parallelepipedal portion of the vessel. To the end walls 29 are joined vertical sealing ribs 31.

The trough-like reservoir at the top of the vertical vessel provides the greatest benefits with the extremely thin or narrow vessels and particularly with those, in which the inside width between the major vertical walls or the side walls of the parallelepiped is less than approximately 2.5 cm. Flaring or widening of the upper portion becomes most important where the inside width of the vessel is less than about 1.5 cm. and it is in fact mandatory for trouble-free operation and insertion and removal of the sheet material or carrier means, where the inside width of the vessel is less than about 1 cm. down to 0.5 cm. or less, depending on the nature of the carrier means, on which the photographic material is contained. A vessel having this narrow width and lacking the upper flared portion, poses considerable inconvenience and difficulty in its use, because it is often awkward to insert the carrier means with the photographic sheet material through the narrow top opening in the absence of suitable guide means. With certain carrier means in which the sensitive photographic layers are located exposed to the vessel walls and edges, damage to the sensitive layer cannot always be avoided if it is inserted into a very narrow vessel lacking the flared upper section or reservoir, particularly when the operation is carried out in dim safelight or in total darkness by relatively inexperienced operators. Furthermore, in the very narrow vessels, the relative volume of the liquid displaced by the inserted carrier and photographic material causes the liquid level to rise considerably upon the insertion of the photographic sheet material contained on the carrier means. To retain the displaced liquid one would have to greatly extend the height of the narrow straight-walled vessel or otherwise avoid any excess of liquid. Making the vessel higher than is necessary, introduces additional inconvenience. Decreasing the total volume of liquid to the absolute minimum could easily result in incomplete treatment, if the liquid level is lowered to the theoretical level e.g. by loss of liquid in case of insufficient drainage of the carrier means and photographic material or by spillage. Ascertainment and continuous checking of the correct liquid level by visual inspection is difficult in the narrow treating vessels, particularly in the dim darkroom safelight, as it must be used in many of the color developing processes or in total darkness.

The vertical treating vessel of the present invention, having the liquid reservoir at the top end, does not pose these difficulties. The upper trough-like section may be flared or widened at the top sufficiently, to permit ready and convenient insertion of the carrier means and photographic material, even in the dark, without damage to the photographic material. It was found that making the top opening of the reservoir at least 2 cm. and preferably more than 2.5 cm. wide, will assure ready insertion of any desired kind of carrier means and will also form a reservoir of sufficient size for the displaced liquid, if it is made at least several centimeters high. The slanting wall sections of the reservoir guide the carrier and photographic material smoothly into the narrow vertical main section of the vessel without damage to the photographic material contained on the carrier.

Usually the vessel is made wide enough in relation to the carrier means to provide enough leeway between the end walls of the vessel and the carrier means for smooth insertion and agitation. If it is desired to make the dimension between the end walls of the vessel as short as is feasible, in order to reduce the required volume of liquid to the minimum and in order to keep the dimensions of the device and apparatus as small as is possible with a given size of the standard sheet of photographic material to be treated, another embodiment of the upright vessel may be used with particular advantage. In this embodiment not only the major side walls also the end walls are flared at their top end.

As is readily apparent insertion of any kind of carrier means into an upright treating vessel encompassing this principle, can be carried out extremely smoothly and trouble-free. The vessel incorporating the principle of the slanting upper sections of the end walls i.e. a superimposed reservoir flaring on all four sides provides the additional advantage that it facilitates pouring of the contents of the vessel without spilling. The pouring of liquids from the upright vessel of the invention may be further facilitated by terminating one of the end walls at a height slightly below the top edge of the other walls of the reservoir, so as to form a shallow depression. Provision of a suitably formed lip provides for most trouble-free pouring of the liquids from the vessel. The pouring aid and/or lip may be provided in its main direction perpendicularly to the narrow vertical wall or its extension in the reservoir respectively, or it may be provided at an angle preferably at aproximately 45° over the corner formed by one narrow and one wide vertical wall or its extension defining the reservoir, respectively. The pouring lip or depression may be provided with advantage in any of the various embodiments of the upright vessel of the present invention, including the disposable vessel.

Another advantageous embodiment of the upright treating vessel of the present invention is characterized by a generally trapezoidal configuration which is achieved by the fact that both end walls are outwardly slanted.

In this trapezoidal embodiment of the vertical vessel the length of bottom 540, measured inside the vessel, is advantageously at least equal to the width of the photographic sheet material to be treated, or of the carrier means on which it is contained, respectively, so as to permit insertion of the sheet material or carrier all the way to the bottom. The liquid capacity of the trapezoidal embodiment of the vertical vessel is somewhat larger than that of the rectangular vessel of the same bottom dimensions. However, the increase in liquid capacity is negligible, if the angle of slant is held small. An angle small enough to provide an increase of the length of the upper edge of the vessel over the bottom by about 1 to 3 cm., increases the usable liquid capacity by only a few percent. The added width at the top of the vessel greatly facilitates the insertion of the carrier. The trapezoidal vessel has the further advantage that it permits readily substantially liquid tight seating in the compartmented water bath, giving it a self sealing quality. This applies if the end walls are serving as the sealing means, and particularly also if it is provided with suitable sealing means of the kind described hereinafter.

The insertion of the carrier means in the upright vessel of the invention in complete darkness may be further facilitated by the provision of luminescent markings at the upper edge of the upright vessel of the invention or at the edge of the bath or compartment, in which it is contained. Such luminescent markings may be provided all around the upper edge and preferably on the outer upper edge of the vessel or merely at the upper edge of the end walls of any of the embodiments of the vessels of the present invention.

The size or liquid capacity of the reservoir provided in the upright treating vessel of the invention may vary in wide limits, depending primarily on the liquid displacement of the carrier means and sheet material to be inserted therein, the desired filling height, the quantity of liquid loss contemplated as a result of the operation of the treating process in the vessel by splashing and incomplete drainage from the photographic sheet material and the carrier means and on many other circumstances.

It was found that, if the reservoir has a capacity lying within 5 to 50 percent of the capacity of the lower section of the treating vessel, most any situation will be successfully handled. It may in special situations, however, be desirable to increase the capacity of the reservoir to be equal to that of the lower portion or even higher, so as to permit the use of larger quantities of treating liquid e.g. if more sheets are to be treated in the vessel. Generally, however, it is preferred to fill the upright vessel only to a level which is at or near the joint of the trough-like reservoir or somewhere in the lower part of the reservoir, giving sufficient leeway for the rise of the level of the liquid caused by the insertion of the carrier means and photographic material. The provision of suitable level indicating means on the inside walls of the vessel, such as horizontal lines, arrows and the like is helpful in assuring the correct height of the level of the treating liquids.

The reservoir may also be made up from curved wall sections. An example of a curved cross-section reservoir is shown in FIG. 5 of the accompanying drawings. Major side walls 552, vertical end walls 553 and a bottom (not shown) form the lower main body of this embodiment of the treating vessel. The superimposed reservoir 554 is formed by curved wide wall sections 555 which are joined at their lower edge to wall sections 552. The faces of the trough-like reservoir are closed by correspondingly shaped end section 556 which are joined to or which are unitary with end walls 553.

The upright vessel shown and described hereinbefore, including the trapezoidal embodiment, is defined for the purposes of the invention as generally a parallelepiped standing on one of its narrow sides with its top open and a reservoir superimposed thereon. For certain applications this basic form may be modified by giving the vessel itself a curved configuration as is shown for instance in FIG. 6 which configuration is also included in the terminology "generally parallelepipedal." Curved vertical side walls 561, vertical end walls 562 and a correspondingly curved bottom (not shown) form the basic body of this embodiment of the upright vessel. Curved outwardly slanted wall sections 563, joined at their lower edge to the top of side walls 561 and short, outwardly slanted wall sections 564 joined with their lower edges to the top edges of side walls 562 define the superimposed reservoir.

Any of the other embodiments of the trough-like reservoir, described hereinbefore, may be modified so as to be useful in the curved embodiment of the vessel of the invention. Likewise, any of the additional features and modifications described hereinbefore and hereinafter may be incorporated in the design of the curved embodiment of the vessel. The curved embodiment of the upright vessel of the present invention is advantageously used in combination with correspondingly curved carrier means.

As stated, it is generally preferred but not necessary, that only the lower narrow portion of the flared embodiment of the vessel is filled with the treating solution. The upper trough-like section serves as a reservoir for the liquid displaced by the photographic sheet and the carrier means, if such are used for their support. The widened portion also serves as protection against liquid splashing around upon removal or actuation of the sheet and the carrier means in the liquid. As is readily apparent, the upper reservoir of the vessel may be dispensed with, if the vessel is relatively wide, so that the liquid displaced by the insertion of the carrier means, rises only slightly and within the capacity of the upper, liquid-free portion of the vessel.

Hereinbefore, the vessels have been described and illustrated with their major vertical side walls being in parallel relationship. For special purposes, these walls may also be inclined toward each other. They may define a vessel being wider at the top, narrowing toward the bottom or, vice versa, they may define a vessel being narrower at the top and widening toward the bottom. The former embodiment facilitates the insertion of the carrier means with the sheet contained thereon and may in certain instances obviate the need for the trough-like reservoir or flared upper portion of the vessel yet giving all the advantages of these embodiments. As is apparent, the use of this expedient requires relatively more treating liquid to fill the vessel to a certain level than is required with the vessels of comparable bottom width in which the major side walls are parallel to each other. The embodiment of the vessel having the inclined major vertical sides is thus used only if the preservation of treating liquid is of no concern or if special situations are to be met. The upright vessel, having parallel major side walls is generally preferred.

As is readily apparent from the foregoing description, good seal of the upright treating vessels of the invention against the walls of the water bath is important for efficient operation, if the upright vessels of the invention are used in the compartmented water bath, employing a unidirectional stream of temperature conditioned water. Any substantial leakage around the narrow vertical sides of the treating vessel reduces the accuracy and efficiency of the temperature control in the particular vessel.

Unlimited exchangeability of the vessels in the compartments of a given bath and a possibility of using vessels of varying thickness or liquid capacity in the same bath is possible with the use of the upright vessel of the invention which is characterized by the provision of a vertical seal strip on the outside of each of the end walls of the treating vessel. The seal strips extend preferably over the whole length or over most of the length of said end walls of the vessel and are advantageously fixedly joined thereto. They may be of the same material or of a material different from that from which the vessel is made. They may be integral with the vessel or they may be joined to the vessel by the use of adhesives or other fastening means. The horizontal cross-sectional profile of the seal strip may be square, rectangular, semicircular or of any other desired irregular shape so as to provide with the selected materials the most effective seal. The strips may be of uniform width and thickness from top to bottom or they may be tapered toward the lower end with the widest cross-section at their top ends. Many variations in the tapered design of the seal strip are possible, the more complex ones usually providing more readily prefect seal upon insertion of the vessel into the coacting sealing means contained in the bath such as depressions, grooves or channels in the opposite end walls of the compartment. The coacting sealing means provided in the opposite end walls of the compartment of the bath are preferably concave counterparts of the said seal strip of approximately identical shape and dimension. If the seal strip is made of or covered by an elastomeric material such as rubber or other elastomeric material or synthetic polymeric material in solid or foamed or expanded condition, excellent seal may be achieved without the need for the observance of close tolerances in the shape or dimensions of the grooves or channels in the compartments and the coacting sealing means in the walls of the water bath or compartments may have any desired shape or size or may be omitted altogether. In this case the walls of the water bath or of the respective compartment in the water bath serve as the cooperating sealing means.

An example of a treating vessel having tapered or wedge-shaped seal strips is shown in FIG. 7 of the accompanying drawings. Upright vessel 570 is defined by major vertical side walls 571, vertical end walls 572 and bottom 573. To the outside of each of walls 572 are fixedly joined tapered seal strips 574 mounted on vertical ribs 575 provided along end walls 572. Seal strips 574 are made of an elastomeric material and mounted such that their thicker profile is at the top and their thinnest profile is at the bottom of the vessel. Insertion of the vessel into a compartment of a suitably dimensioned compartmented water bath, having concave tapered grooves or channels of corresponding dimensions and shape, will provide instantaneous tight seal merely by the weight of the vessel filled with the treating liquid or by slight downward pressure on the vessel.

If the seal strips provided at the end walls of the vessel are made from a non-elastic material and if it is not desired to maintain close tolerances, perfect seal may be achieved by making or by lining the concave holding means in or at the end walls of the compartment or in the side walls of the bath with an elastomeric material. In this embodiment ribs 574 may directly serve as the vessel-mounted sealing means. It is important to note that the vessel-mounted sealing means extend to a level at least slightly higher than the water level in the bath, when the vessel is inserted therein so as to prevent water from overflowing the sealing means. Similarly it is desirable that good seal is established between the cooperating sealing means up to the water level in the bath.

As mentioned hereinbefore, it is usually desirable to make the treating vessel as narrow as is possible so as to reduce its liquid capacity to the minimum required for the treatment of a given number of sheets, say 2, 4, 6, 8 or 10 or more, depending on the desired use and on the circumstances. Since the treating capacity varies with the nature of the treating medium, it is often of advantage to provide in one series of treating vessels, needed for the carrying out of a given multistep process, vessels of varying thickness or width, though otherwise or identical dimensions and thus of varying liquid capacity. Thus, a vessel intended for a treating solution A, having double the treating capacity of treating solution B, need be only half as thick in its interior dimension as the vessel for solution B and so forth.

In this manner all the treating solutions are exhausted at the same time after the treatment of a predetermined number of sheets of photographic treating material. This renders the operation of the photographic process more economical and more reliable, obviating the need for storing and reusing partially used liquids and thus eliminating an important source of error and failure as described hereinbefore. The use of vessels of varying liquid capacity interchangeably in a given bath is made possible by the use of the various supporting and sealing means described hereinbefore and by selecting identical sealing means in a given system for all types and sizes of vessels.

The only limitation controlling the reduction of the thickness of the treating vessels is the space required for the insertion of the sheet material contained on the carrier means, to be used with the vessels. These may be designed to be very thin as is described in detail in my co-pending application Ser. No. 342,028 filed Feb. 3, 1964. Thus if desired, the thickness of the vessels may be as low as a quarter of an inch or even less. For the simultaneous treatment of more than 2 sheets one will usually employ vessels of a greater thickness of say one half inch up to one or even several inches. The interchangeable use of standard seal strips with various vessels, having different liquid capacities, in a compartmented bath having identical holding means in each compartment is illustrated in FIG. 8 of the accompanying drawings. Rectangular compartments 581 and 582 forming part of a rectangular water bath are defined by major vertical walls 583, joined at right angles with the vertical side walls 585 of the water bath and completed by the bottom of the water bath (not shown), to which walls 583 and 585 are joined in sealing relationship. Each section of wall 585 forming part of the compartment has in its center portion a vertical recess 586. These recesses extend from the top edge of wall 585 to a point close to but above the bottom of the cell. All recesses 586 are of identical size and dimensions in all compartments making up a given bath. Upright vessel 587 is inserted in cell 581 and vessel 588 is contained in cell 582. The vessels are of rectangular configuration. Vessel 587 is essentially a wide upright parallelepiped of a width close to that of cell 581. Vessel 588 is a narrow parallelepiped with a superimposed reservoir of the kind described in FIGS. 1 and 2 of the accompanying drawings. Its upper trough-like reservoir has an upper inside width which is identical to that of the top opening of vessel 587. The lower body of vessel 588 is an upright parallelepiped of an inside width which is a fraction of that of vessel 587, thus giving it an overall liquid capacity which is also only a fraction of the liquid capacity of larger vessel 587. To the end walls of each of vessels 587 and 588 are centrally joined vertical ribs 589, serving as sealing means. Ribs 589 on both vessels are of identical dimensions and shape and are dimensioned to slideably fit into recesses 586 in the end walls of the compartments. The vertical downward extension of the recess controls the depth of insertion of the upright vessels. They terminate somewhat above the bottom of the cell so as to assure the maintenance of a passage way for the unidirectional stream of water passing underneath of each of the inserted vessels. The standardization of the size, shape and relative location of the recesses 586 with respect to each compartment and of the seal strips with respect to each vessel, regardless of thickness and capacity of the treating vessel assure ready interchangeability of the vessels made for a given compartmented bath.

Instead of providing male sealing means on the end walls of the vessel and cooperating female sealing means in or at the walls of the bath or in each compartment contained in the bath, the female sealing means may be provided in the end walls of the upright vessel with co-operating male sealing means provided in the bath. The vessel dipicted in FIG. 9 of the drawings employs this expedient. Upright vessel 590 is formed by major side walls 591, end walls 592 and bottom 593. Grooves 594 in the end walls 592 serve as the sealing means when the vessel is inserted in the bath or compartment over co-operating sealing means being in the form of vertical ribs projecting into the bath or compartment. For improved seal either the grooves 594 in the end walls of the vessel or the cooperating sealing means or both the female and the male sealing means may be provided with a liner or a profiled member of an elastomeric material as described hereinbefore.

The vessels of the invention may be manufactured by the usual methods. They may be constructed from individual, suitably shaped components using adhesives, or soldering or welding methods or similar methods as the means for joining the components. They may also be formed in one piece e.g. by injection molding, extrusion, stamping, or by blowing techniques, particularly if they are manufacture from thermoplastic construction materials. It was found that the vessels may be most conveniently produced by vacuum forming methods using a split mold. Each half of the mold has a cavity corresponding to one-half of the vessel cut along its vertical symmetry line parallel to the long vertical walls of the vessel. Both halves of the mold are advantageously joined at the bottom by a hinge and each half of the mold has spacers and its independent vacuum chamber and connection to a source of vacuum. In the actual operation the mold is opened and laid flat on a vertical support with the mold cavities up. A sheet of thermoplastic material, large enough to completely cover both halves of the mold with enough excess material so as to overlap all around is placed on the mold and heated to the molding temperature, so that it softens and makes contact with the edges of the mold. Thereafter, vacuum is applied to both halves of the mold such that the heat-softened sheet is closely drawn into the mold, conforming the underside of the sheet to the contours of the mold. While maintaining vacuum in each of the halves of the mold, the mold is lifted off the support and closed with the sheet adhering to the mold. The mold is then clamped tight so that the overlapping portions of the sheet, supported by peripheral extensions of the mold, are tightly joined and adhered together to seal the overlapping portions of the vessel. After cooling and removal of the vessel from the split mold, the sides and top are trimmed to finish the treating vessel. If a seal strip is desired on the end walls, the joined overlapping portions are only partially trimmed off, to leave a vertical rib of the desired dimension and shape. If the said joined overlapping sections along the end walls are completely and smoothly trimmed off, one obtains a vessel having no seal strip. Cutting knives built into the mold may serve to score or completely cut the trimming lines as the vessels are produced. The molds and the method of production may be modified in various ways in accordance with the principles known in the art.

Production of the vessels by the just described vacuum forming technique provides clean surfaces and accurate dimensions on the outside of the vessel where close tolerances are desirable, particularly in the seal strips if the vessel is to be used in the compartmented water bath.

In its application to the color processing techniques the upright vessel is with advantage designed and dimensioned such that it accommodates an amount of the treating liquid which will safely process only the small number of sheets of the color material which is usually processed in the short sessions, say four, five or six and up to 10 or 20 sheets of the maximum size for which the apparatus is designed. If more than this predetermined number of sheets is to be processed, the liquid may be simply discarded and fresh liquid is placed into the vessel, or it may be replenished by the addition of the chemicals provided for this purpose. In multistep processes each vessel may be dimensioned for the particular effectiveness and treating capacity of the liquid for which it is designed, so that after each session or after the treatment of the predetermined number of sheets all the solutions or processing liquids used in the particular process may be discarded. This expedient has the additional advantage—aside from the savings possible by the complete exhaustion of each of the processing liquids to their safe limits—that always fresh processing liquids are used. This is an important factor in achieving absolute reproducibility of the results, particularly in the complex and sensitive color developing processes. It removes the need for the storage of partially used liquids in separate containers, or the risk of contamination and spoilage prevailing when the used portions of the treating liquids are poured back into the containers containing the supply of the fresh solutions. Thus the above described arrangement in accordance with the present invention contributes considerably to the simplification of complex, multistep photographic processes and particularly also of the multistep color developing methods.

The requirements of processing liquid in a practical application of the narrow upright vessel of the present invention are set out in my Patent 3,236,649 to which special reference is made.

The vessel may be made wider. If it is made 4 cm. wide, it will permit the development of up to approximately 20 sheets in one filling of the developer solution. This number will be correspondingly smaller or larger as the treating capacity of the particular developer used varies, or as other factors are introduced or modified. Replenishment will increase the number substantially. If it is desired to treat large numbers of sheets at one time e.g. with the use of baskets holding a multiplicity of sheets or the multiple sheet carriers as described in my copending application Ser. No. 342,028 filed Feb. 3, 1964, the vessels may be made even wider. Widths of 8 to 10 cm. or up to 20 cm. are possible though as one increases the capacity of the vessel, one will realize less and less the particular advantages inherent in the upright vessel of the present invention. Adjusting the capacity of the upright vessel used for each step so that the quantity of treating liquids contained in each vessel is spent after the treatment of an equal predetermined number of sheets of photographic material offers additional advantages.

Instead of having the carrier or support, containing the photographic sheet or sheets, to be treated, forwarded by the operator by hand, one may provide automatic forwarding means. Such means are described and claimed in my copending application Ser. No. 342,029 filed Feb. 3, 1964. The device incorporating these principles may be controlled and actuated by a multistep timer such as that described in detail in my copending application Ser. No. 302,902 filed Aug. 19, 1963.

The operation of these automatic forwarding means and usually also the forwarding of the carrier means by hand is facilitated by the use of another embodiment of the treating vessel of the present invention in which one of the upper edges of the long vertical wall is extended upward to a level higher than the opposite, so that the upper opening of the vessel is slanted against its normal horizontal position. The vessel is placed into the bath in such manner that the extended wall is on the far side of each vessel relative to the direction of forwarding of the photographic material in the bath. The extended wall section serves as a stop and guide which prevents overshooting of the lower end of the carrier when it is suspended and travelling toward the vessel. It will thus, upon lowering of the forwarding means, be guided into the vessel without the risk of misplacement or spilling. Similar benefits may also be obtained with this modification of the treating vessel of the invention, if the carrier or support is forwarded from vessel to vessel by hand.

FIGS. 10 and 11 show in schematic representation two preferred embodiments of this expedient as applied to upright treating vessels, having superimposed reservoirs of different design. Referring to FIG. 10, reservoir 601 is joined by slanting wall sections 602 to the major side walls 603 of the lower parallelpipedal section of the vessel. The left vertical wall 604 of the reservoir 601 extends to a substantially higher level than the opposite wall 605 of the reservoir. The reservoir is closed by ends 606, the top edge of which is slanted so as to connect the upper edges of walls 604 and 605.

Referring to FIG. 11, reservoir 610, having a substantially triangular cross sectional configuration, is joined to major side walls 611 and 612 of the lower parallelepipedal section of the vessel. Side wall 612 at the left is extended vertically upwardly to a level, substantially higher than the top edge of slanted wall 613 defining the reservoir 610 together with a portion of the extended major side wall 612 and end walls 614.

Besides resistance to the corrosive action of treating liquids other considerations may play an important part in the selection of construction materials for each of the treating vessels. It is preferred that the vessel used for color developers and for color bleaching baths, is made from high grade stainless steel or from other corrosion resistant metal. These materials permit most readily maintenance of an accurate temperature within the vessel because of the excellent heat transfer properties of the metal. The vessels for most other treating solutions requiring less accurate temperature control, are advantageously made from plastics because of their lower price and their providing the possibility of using less expensive manufacturing methods as described hereinbefore.

Among the preferred materials are polyolefins, high impact styrene polymers and copolymers, acrylate polymers or copolymers and many other synthetic polymers well known in the art, including the heat settable resins. These materials are sufficiently form stable at the temperatures encountered in photographic treating processes and possess the chemical indifference to withstand the corrosive action of most of the treating solutions used in most photographic treating processes. Advantageously, the upright vessels are made from varying materials, depending on the intended use and on the nature of the treating solutions to be employed in the respective vessels.

Detailed instructions for the selection of construction materials for photographic equipment are contained in a booklet published by the Eastman Kodak Company in 1957 under the title: "Construction Materials for Photographic Processing Equipment." This booklet and the original literature cited therein provide a wealth of data and information which may be applied with advantage in the selection of the most suitable and economical construction material for the treating vessels and troughs of the present invention.

Instead of making the vessels from the usual heavy gauge plastic sheet material they may be made from high quality, high impact plastic materials of relatively thin gauge, yet strong enough to withstand the strain and static pressure of the liquids contained therein. This together with the inexpensive manufacturing methods reduces their price to the point that they may be simply discarded after one use or after several subsequent uses obviating the necessity of cleaning the vessels. Thorough cleaning of the treating vessels and containers after each use is, as is well known, of prime importance with some of the color developing processes for the achievement of outstanding consistant results.

The use of the disposable vessels of the present invention thus eliminates the risk and danger of unintentional contamination by residual chemicals contained in the vessel from prior treatments, particularly if one and the same vessel is successively used with different treating solutions, without complete and thorough cleaning.

Instead of making the disposable embodiment of the treating vessel of the present invention from rigid plastics one may use with advantage such other thin materials as cellulosic sheet materials, particularly paper stocks or cardboard which are coated on the inside or advantageously on the inside and the outside with chemically resistant plastic materials or other water and chemically resistant materials.

The disposable vessel of the invention may be made strong enough to be selfsupporting when it is inserted in the bath, with the treating liquid contained therein. If they are made from a thinner gauge material such that their rigidity is not great enough to prevent bulging or deformation, when the treating liquids are contained therein, they are advantageously used as an insert or lining in a supporting vessel. In this embodiment of the invention limp linings, which are fluid tight, such as those from plastic films, may be used with advantage. After each use it is only necessary to discard the inner lining and substitute in the next session a fresh liner. These liners may be made with advantage from very thin limp or rigid thermoplastic materials. Unless the supporting vessel is made from metals or other heat conductive materials the heat transfer qualities of the arrangement may be further improved, to give better temperature control within the vessel, by the use of a perforated supporting vessel as the support for the liner.

The supporting vessel has basically the shape and dimensions of the treating vessel as described hereinbefore. Any of the variations, modifications and special embodiments described hereinbefore may be used and may be applied to or incorporated in the preforated or non-perforated supporting vessel, particularly also the sealing means and the variously shaped and dimensioned troughlike reservoirs superimposed at the top of the vessel. The supporting vessel may be an exact parallelepiped or, if desired, the modifications of the basic parallelepipedal shape, described hereinbefore and falling under the term "generally parallelepipedal" as used herein, may be applied with equal advantage.

If the liner or supported disposable vessel is made of a soft or limp material, its top edges are advantageously temporarily fastened to the upper edge of the supporting structure such as by the provision of flanges or flaps or similar means overlying the upper edges of the supporting vessel or by the use of suitable hooks or clamping means. Upon filling the liner with the treating liquid, the hydrostatic pressure expands the liner, pressing it snugly against the walls of the supporting vessel which gives it the support needed to maintain the exact shape desired for the treatment of the sheet material. The rigid disposable vessel or the supporting vessel with the rigid or limp disposable vessel contained therein, is inserted into and used in the bath or in the compartments of the bath in the same manner as described hereinbefore.

The just described embodiment of the vessel of the invention provides not only the convenience of disposability of the inner liner or vessel, but also the advantage of better temperature control because most of the surface area of the very thin liner or of the very thin disposable vessel is in direct contact with the temperature conditioning water contained in or flowing through the bath, giving greatly improved heat transfer properties due to the extreme thinness of the material. Best performance of the limp liner is achieved if the treating liquid in the vessel stands slightly higher than the surrounding water in the water bath.

An embodiment of an upright perforated supporting vessel with a rigid liner inserted, is illustrated in FIG. 12 of the accompanying drawings. The perforated supporting adjuvant vessel comprises major vertical side walls 631, and walls 632 and bottom 633. End walls 632 and bottom 633 are made of a solid, non-perforated material as described hereinbefore with respect to the upright treating vessel. End walls 632 are sloping from top to bottom. Adjoining side walls 631 form a trapez, with its base lying at the upper edge of the supporting vessel. Along the center of end walls 632 are joined vertical ribs 635 serving as the sealing means, when the vessel is inserted in cooperating counter sealing means contained in the bath or compartment.

Major side walls 631 are comprised of frame members 636, 637, 638 and 639, which are joined at their ends with each other so as to form a frame-like structure. The central portion of the side walls 631 comprises a grid 641 of crossing narrow strips, leaving a multitude of openings or perforations in the side wall. Shown inserted in the supporting vessel is disposable vessel 642 of a shape and dimensions corresponding to those of the inside of the supporting vessel.

Any other type of sealing means may be employed depending on the desired use, or alternatively separate sealing means may be omitted altogether, if the end walls of the supporting vessel are to serve as the sealing means, as described hereinbefore. The perforations in the major side walls may be of any other desired shape, configuration or size. They may be triangular, oval, circular or of any other desired more complex shape. The grid pattern may be oriented in any other desired direction relative to the frame structure.

Upon filling the inner disposable vessel with the treating liquid its end walls lie against the inside of the end walls and of the side wall frame structure of the perforated supporting vessel, thus providing a seal particularly also along the slanted end walls of the supporting vessel, so that water flowing in the water bath is prevented from passing through the perforations in the supporting vessel and around the liner instead of underneath the vessel. The seal may be further improved by filling the inner disposable vessel with treating liquid to a level slightly above the level of the water in the water bath.

If the inner disposable vessel is made of a relatively rigid material, it may be of advantage to provide additional cooperating sealing means on the inside of the end walls of the supporting vessel and/or on the outside of the end walls of the disposable vessel. Provision of a thin vertical strip of an elastomeric material joined to the inside of said vertical end walls of the supporting vessel will generally be sufficient to achieve perfect seal. Alternatively, the end walls and/or the vertical edges of the disposable vessel may be provided with strips of an elastomeric material which provides the desired seal. A pair of cooperating sealing means provided along the inside of the end walls of the perforated supporting vessel and along the outside of the end walls of the disposable vessel may also be used as the means for providing the desired seal whereby the principles and materials described hereinbefore may be used with advantage to further facilitate the obtention of a perfect seal.

The perforated supporting vessel may be made of plastics or any other desired construction material including metals. It is not necessary to use stainless steel or equivalent corrosion resistant metals because the supporting vessel is not in direct contact with concentrated corrosive treating liquids, so that there is no serious problem of contaminating the treating liquids. Less expensive metals such as steel, copper or brass properly protected by the usual corrosion resistant metal coatings or by paints or coatings of other protective materials have proven satisfactory for their construction. If desired, the supporting vessel may be designed as a simple wire brasket of suitable shape and dimensions, having only solid end walls.

Tight seal between the end walls of the disposable vessel and the juxtaposed end walls of the perforated supporting vessel can also be achieved by the use of another embodiment of the disposable vessel of the invention which offers the additional advantage of convenience and ease of insertion and removal from the supporting vessel when it is filled with treating liquid. This embodiment of the disposable upright vessel is characterized by the provision of generally vertical folds on their wide side walls, preferably close to each of the four vertical corners. The provision of suitable gripping means at the upper edge of the end walls of the disposable vessel further facilitates the insertion and removal of the disposable vessel into and from the supporting vessel.

FIG. 13 of the accompanying drawings depicts an embodiment of the disposable vessel, having both the folds and the gripping means. It is to be understood, that each of these means may be employed with advantage independently of the other. The disposable vessel comprises narrow end walls 651, major vertical side walls 652 and bottom 653. Close to each of the vertical corners of the vessel, the vertical side walls are provided with generally vertical folds 654, extending over the height of the side wall 652 from the bottom edge to the top edge. Each fold is comprised of three creases 655, 656 and 657 and forms (in top view) a triangle, the apex of which points to the interior of the vessel. The creases are shown starting from one point 658 at the bottom edge, fanning out toward the top edge of side wall 652. The creases may, however, also be provided in a more or less parallel relationship to each other in combination with corresponding creases in the bottom. Ears 659, being an extension of the narrow vertical side walls 651 beyond the top edge of the vessel, serve as gripping means or handles.

This embodiment of the disposable vessel is advantageously used in combination with a supporting vessel of the trapezoidal variety described hereinbefore, having side walls of a reversed trapezoidal configuration and end walls slanting outwardly from the bottom toward the top. The supporting vessel is beneficially perforated. When the disposable vessel is placed in the supporting vessel and treating liquid filled into said disposable vessel, the folds will tend to flatten out by the static pressure of the liquid until the end walls 651 touch the juxtaposed end walls of the supporting vessel providing tight seal. The extended position of end walls 651 with the fold 654 completely flattened is represented by broken lines 660, with ears 659 being represented by broken lines 662. The angular expandability of the vessel is advantageously somewhat in excess to that required by the slope of the juxtaposed end wall of the trapezoidal supporting vessel. This expedient assures tight positioning of the narrow vertical side wall 651 of the disposable vessel against the coordinated side in the supporting vessel so as to seal off both vertical sides of the vessel. This is, as explained hereinbefore, a particular importance for efficient operation in the compartmentized multicellular bath, using a stream of temperature conditions water. Provision of seal strips of elastomeric or other materials or any other suitable sealing means, as described hereinbefore on the outside of the end walls of the disposable vessel or on the inside of the end walls of the supporting vessel or on both, permits further improvement of the seal, if this is desired or necessary. If the operator grips the vessel with the hands by each of the ears, pulling the ears slightly toward each other, he breaks the contact of the vertical side walls with the vertical side walls of the supporting vessel and by reforming the folds, the friction of the disposable vessel against the walls of the supporting vessel is sufficiently reduced to permit lifting the disposable vessel from the supporting vessel.

If desired, the ears may be omitted. In this case the operator lifts the supporting vessel from the bath or compartment with the disposable vessel still inserted. After emptying the disposable vessel, the folds will at least partially reform and the disposable vessel may then be readily removed from the supporting vessel. It was found that the just described expandable self sealing disposable vessel may be made with great advantage from such materials as plastic coated paper or cardboard stock, or from thin rigid plastic materials such as high impact styrene polymers or the like, which have a certain stiffness or rigidity without being completely inflexible. This material is readily capable of being formed into the folds and has sufficient elasticity to permit flattening and reforming of the folds as desired.

The just described embodiment of the disposable vessel may be further modified by the incorporation of any of the other feature or means, described hereinbefore with respect to the upright vessel and any other modifications coming readily to mind may be made with equal advantage. The folds may be placed directly at the vertical edges of the vessel. Instead of providing a total of four folds, their number may be decreased or increased. In certain instances two vertical folds, i.e. one on each of the wide side walls e.g. somewhere in the center portion, are satisfactory to obtain the benefits of the invention. With certain other materials it is of advantage to provide more than two folds in each wide side wall. The folds may be grouped in pairs or in groups of three or more, or they may be distributed over the width of the side walls in even or uneven spacing. These modifications are particularly adapted to be employed with folds in which the creases are substantially parallel to each other and in which coordinated folds are also provided in the bottom of the disposable vessel.

If desired, one or several additional folds may be provided in the end walls of the disposable vessel. With suitable gripping means, provided on the disposable vessel the additional folds in the end walls permit the vessel on lifting, to decrease its length and width, thus further reducing the friction against the walls of the supporting vessel and facilitating the insertion and removal of the filled disposable vessel into and from the latter, without detriment to the tightness of the seal between the supporting vessel and the inserted disposable vessel.

The present invention includes also the concept of employing interchangeably vessels, adapted for the economical treatment of sheet material of a size smaller than the standard size in a given water bath. The vessel is made of smaller dimensions than those adapted for the treatment of the standard sheets, preferably of a size not larger than necessary for the treatment of the desired smaller sheet. Interchangeablility of the smaller vessel in a standard size bath is achieved by extending in the smaller sized vessels the sealing means outwardly to a width corresponding to that of the standard size treating vessel, so as to permit their insertion in the cooperating sealing means in the standard water bath. The extended sealing means are also advantageously extended downwardly, so as to form a plate-like structure, with the vessel integrally suspended therein. As is apparent, this plate-like structure has a size corresponding approximately to that of the standard size treating vessel including the sealing means.

An embodiment of the smaller than standard size treating vessel is illustrated in FIG. 14 of the accompanying drawings. Upright vessel 700 comprises major side walls 701, end wall 702 and bottom 703. Vertical sealing means 704 are oversized to contact to the end walls and bottom of the vessel. The plate-like structure of sealing means is joined to the vertical center of end walls 702 and of bottom 703 of the vessel.

Any of the various modifications and adjuvant means described hereinbefore may be employed with equal advantage to the smaller-than-standard size vessel. This includes the superimposed reservoir which is advantageously provided on the very narrow vessels, the use of the disposable vessel, the employment of more complex or efficient adjuvant sealing means, the trapezoidal configuration of the plate-like structure and many other features as they come to mind.

As is readily apparent, the various features illustrated hereinbefore with specific embodiments of the treating vessel of the invention may be recombined to form a multitude of new combinations and new embodiments of the upright treating vessels of the present invention. Such modifications are, on the basis of the principles and inventive concepts taught hereinbefore, within the skill of the artisan and fall within the ambit and scope of the present invention. The various forms of bottom, upper trough-like extensions, sealing strips and supporting means for the vessels, arrangement of underflow and overflow may be readily adjusted to form new embodiments of the invention, too numerous to be illustrated.

As many apparently widely different embodiments of this invention may be made without departing from the spirit and scope thereof, it is understood, that the invention is not limited to the specific embodiments thereof, except as defined in the appended claims.

I claim:

1. An upright vessel, having an opening at the top end and being adapted for the treatment of photographic material in sheet form, which vessel is generally a parallelepiped formed by two major side walls, two end walls and a bottom; substantially vertical sealing means provided on said end walls; said sealing means being adapted to provide a substantially liquid tight seal with external cooperating sealing means, when the vessel is suspended therein; and a trough-like reservoir superimposed on said parallelepiped, so as to permit the retention of a photographic treating solution in the extended vessel.

2. An upright vessel, having an opening at the top end and being adapted for the treatment of photographic material in sheet form, which vessel is generally a parallelepiped formed by two major side walls, two end walls and a bottom; substantially vertical sealing means provided on said end walls, said sealing means being tapered from top to bottom such that the outermost edges of the pair of sealing means outline a wedge shaped configuration with the narrow part at the bottom, so as to provide a substantially liquid tight seal with external cooperating sealing means, when the vessel is suspended therein.

3. An upright supporting vessel for the reception of a disposable photographic treating vessel, which supporting vessel is generally a parallelepiped formed by two major side walls, two end walls and a bottom; substantially vertical sealing means provided on said end walls, said sealing means being adapted to provide substantially liquid tight seal with external cooperating sealing means, when the supporting vessel is suspended therein; the major side walls of said supporting vessel being perforated, so as to permit access of a surrounding temperature conditioning liquid to a major area of the side walls of a disposable photographic treating vessel, when it is contained in said supporting vessel.

4. A generally parallelepipedal upright photographic treating vessel which comprises two major side walls, two end walls and a bottom, said vessel comprising furthermore at each of its end walls a single, substantially vertical rib, protruding outwardly from the end walls, as external sealing means, said ribs being adapted to fit slideably in external groove-like sealing means so as to provide substantially liquid-tight seal between said ribs and said groove-like sealing means.

5. The vessel of claim 4, in which the major side walls comprise a plurality of perforations.

6. A generally parallelepipedal upright photographic treating vessel which comprises two major side walls, two end walls and a bottom, said vessel comprising furthermore at each of its end walls a single, substantially vertical external rib extending outwardly from said end walls and being positioned approximately along the vertical center line of each of said end walls, wherein the outer free edge of each of the ribs is slanted inwardly toward the bottom of said vessel, so as to outline together the sides of an invented trapezoid.

7. A generally parallelepipedal upright photographic treating vessel, which comprises two major side walls, two end walls and a bottom and superimposed at its open top end a trough-like reservoir, which vessel comprises furthermore at each of its end walls a single substantially vertical rib, as the external sealing means, provided approximately along the vertical center line of each of the end walls, wherein the outer free edge of each of said ribs is inclined inwardly toward the bottom of the vessel, so as to slideably fit into groove-like depressions contained in the side walls of a photographic water bath and being inclined by approximately the same angle, as the outer free edges of said ribs.

8. A generally parallelepipedal upright photographic treating vessel which comprises two major side walls, two end walls and a bottom, which vessel comprises furthermore in each of the end walls an essentially vertical groove-like depression, which extends also through the ends of the bottom of the vessel, such that the groove-like depression fits slideably over the cooperating rib-like male sealing means contained at the side walls of a photographic water bath, with the provision of instantaneous essentially water tight seal, when the vessel is inserted in said water bath.

References Cited

UNITED STATES PATENTS

| | | | |
|---|---|---|---|
| 454,518 | 6/1891 | Doyle | 95—96 |
| 1,528,890 | 3/1925 | Petersen | 220—23.2 |
| 2,252,259 | 8/1941 | Horner | 95—96 |

JOHN M. HORAN, *Primary Examiner.*

NORTON ANSHER, *Examiner.*

C. B. PRICE, J. F. PETERS, *Assistant Examiners.*